United States Patent

Hattori et al.

[11] Patent Number: 4,784,806
[45] Date of Patent: Nov. 15, 1988

[54] METHOD FOR PRODUCING ANTHRAQUINONE COMPOUNDS

[75] Inventors: Makoto Hattori; Satoshi Kajitani, both of Osaka, Japan

[73] Assignee: Sumitomo Chemical Company, Limited, Osaka, Japan

[21] Appl. No.: 938,250

[22] Filed: Dec. 5, 1986

[30] Foreign Application Priority Data

Dec. 10, 1985 [JP] Japan ................. 60-278588

[51] Int. Cl.$^4$ ............................................. C07C 97/24
[52] U.S. Cl. ..................................................... 260/378
[58] Field of Search ......................................... 260/378

[56] References Cited

U.S. PATENT DOCUMENTS

| | | | |
|---|---|---|---|
| 1,938,029 | 12/1933 | Kugel | 260/378 |
| 3,203,751 | 8/1965 | Hildreth | 260/378 |
| 4,294,769 | 10/1981 | Krock et al. | 260/378 |
| 4,299,771 | 11/1981 | Takeshita et al. | 260/378 |
| 4,519,947 | 5/1985 | Hattori et al. | 260/378 |

FOREIGN PATENT DOCUMENTS

| | | | |
|---|---|---|---|
| A20105762 | 4/1984 | European Pat. Off. | 260/378 |
| 1108704 | 12/1961 | Fed. Rep. of Germany | 260/378 |
| A176944 | 10/1982 | Japan | 260/378 |
| A167952 | 10/1982 | Japan | 260/378 |
| 2066281 | 7/1981 | United Kingdom | 260/378 |

OTHER PUBLICATIONS

Japanese Kokai–Chem. Abstracts, vol. 98, 1983: JP 57/176,944.

Japanese Kokai–Chem. Abstracts, vol. 98, 1983: JP 57/167,952.

*Primary Examiner*—Robert T. Bond
*Assistant Examiner*—Raymond Covington
*Attorney, Agent, or Firm*—Cushman, Darby & Cushman

[57] ABSTRACT

Anthraquinone compounds of the formula,

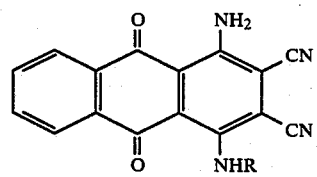

wherein R is hydrogen, alkyl or cycloalkyl, which are useful as intermediates for disperse dyes and as sublimable dyes for thermal transfer recording, are prepared by allowing the compound of the formula,

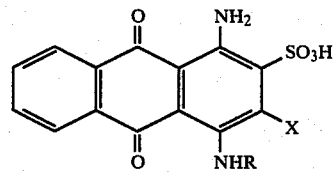

wherein X is hydrogen or sulfonic acid group, to react with a cyanogenating agent in an aqueous medium in the presence of a compound, such as polyalkylene glycols.

9 Claims, No Drawings

METHOD FOR PRODUCING ANTHRAQUINONE COMPOUNDS

This invention relates to an improved method for producing 1,4-diamino-2,3-dicyanoanthraquinone compounds.

The anthraquinone compounds are important intermediate materials for anthraquinone disperse dyes, and these compounds themselves are useful as sublimable dyes for thermal transfer recording.

It has been known, for example, in the U.S. Pat. No. 1,938,029, West German Pat. No. 1108704, and U.S. Pat. No. 3,203,751, that the anthraquinone compounds can be obtained by subjecting an aqueous solution of a starting compound, 1,4-diaminoanthraquinone-2-sulfonic acid compound to reaction with a cyanate compound. These methods are not satisfactory in yield and purity of the product. Furthermore, it is very hard to use the product as such for the production of dyes having clear shade without any purification, because the product unevitably contains the unreacted starting compound, and by-products such as 1,4-diamino-2-cyanoanthraquinone compounds, and hydrolyzed or oxidized products of the starting compound and the desired compound.

One approach which has been proposed to overcome these defects is that the starting compound is subjected to cyanogenation in the presence of formaldehyde or N-methylformamide (Published Unexamined Japanese Patent Application No. 24449/1981). According to this method, the by-production of 1,4-diamino-2-cyanoanthraquinone compounds can be controlled to some degree. However, the method is not yet satisfied, because of another difficulty such that secondary decomposition and/or oxidation products of the desired products and/or the by-products mentioned above are easily produced.

Another approach is that the 1,4-diaminoanthraquinone-2-sulfonic acid or a salt thereof is subjected to cyanogenation in the presence of a quaternary ammonium compound or a quaternary phosphonium compound in an aqueous medium (U.S. Pat. No. 4,299,771, Published Unexamined Japanese Patent Application Nos. 167952/1982 and 176944/1982). In these methods, the desired product of high purity can be obtained with high yield, but considerable effort is required for recovery of the quaternary compound which is expensive and has relatively high toxic $H_4$.

The present inventors have undertaken extensive studies to improve the defects of the above known methods, and as a result found that the object can be accomplished by carrying out the cyanogenation in an aqueous medium in the presence of a specific compound.

This invention provides a method for producing an anthraquinone compound having the formula (III)

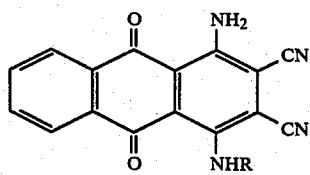

wherein R is a hydrogen atom, or an unsubstituted or substituted alkyl or cycloalkyl group, which comprises reacting a compound having the formula (I), or a salt thereof

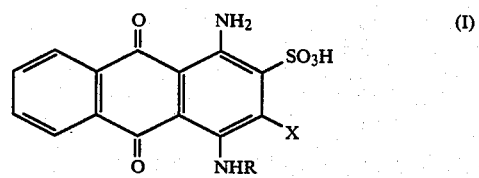

wherein R is as defined above and X is a hydrogen atom or a sulfonic acid group, in an aqueous medium with a cyanogenating agent in the presence of a compound of the formula (II),

wherein A is a bivalent aliphatic saturated hydrocarbon residual group having 2 to 4 carbon atoms, R' is a hydrogen atom or an alkyl group having 1 to 4 carbon atoms, and n is a number of from 1 to 100.

According to the method of this invention, yield and purity of the desired product are higher than those in the known methods above. Furthermore, the compound of the formula (II) used in this invention, which is relatively low in toxicity and high in safety, is easily recovered without undue expense.

The starting materials having the formula (I) used in this invention include 1,4-diaminoanthraquinone-2-sulfonic acid, 1,4-diaminoanthraquinone-2,3-disulfonic acid and their derivatives having an unsubstituted or substituted alkyl or cycloalkyl group as R in the formula (I). The alkyl group includes $C_1$-$C_6$ alkyl groups, hydroxy-substituted or unsubstituted $C_1$-$C_4$ alkoxy $C_1$-$C_5$ alkyl groups, and the cycloalkyl group includes cyclohexyl group unsubstituted or substituted with $C_1$-$C_3$ alkyl group. These starting materials (I) may be in the form of free acid or salts, for example, alkali metal salt such as sodium, potassium or lithium salt or ammonium salt.

In the compound of the formula (II), examples of the residual group A are ethylene group, propylene group, trimethylene group, and tetramethylene group. Of these, preferred are ethylene group and propylene group. Examples of the alkyl group represented by R' are methyl, ethyl, n-propyl, n-butyl, isopropyl, isobutyl sec-butyl, and tert-butyl group. Preferred R' is a hydrogen atom. The number n representing a repeating unit of —A—O— is from 1 to 100, preferably from 1 to 20.

Examples of the compounds (II) are ethylene glycol, diethylene glycol, triethylene glycol, tetraethylene glycol, pentaethylene glycol, hexaethylene glycol, polyethylene glycols 200, 300, 400, 600, 1000, 1500, 2000, 4000, and the like, and their mixtures; propylene glycol, dipropylene glycol, trimethylene glycol, polypropylene glycols 400, 1000 and the like, and their mixtures; copolymers of ethylene oxide and propylene oxide; mixtures of the above illustrated compounds; and monoalkyl ethers of said alkylene or polyalkylene glycols. Of these, preferred from a commercial point of view are polyethylene glycols having an average molecular weight of 200 to 600, such as polyethylene glycol 200, 300, 400, and 600.

The amount of the compound (II) to be used varies depending on the kind of the starting material (I) and the compound (II). Usually, it is from 2 to 90% by weight, preferably from 5 to 80% by weight, based on the total weight of the aqueous medium and the compound (II). For example, polyethylene glycol 400 may be used for the reaction with 1,4-diaminoanthraquinone-2-sulfonic acid or its derivative, or 1,4-diaminoanthraquinone-2,3-disulfonic acid or its derivative, in an amount of from 25 to 85% by weight, preferably from 30 to 80% by weight, or from 2 to 85% by weight, preferably from 2.5 to 80% by weight, respectively.

In this invention, the total weight of the aqueous medium and the compound (II) ranges from 2 to 30 times by weight the weight of the starting material (I).

The cyanogenating agent usable in this invention includes cyanides of alkali metals, alkaline earth metals or ammonium. Examples thereof are sodium cyanide, potassium cyanide, ammonium cyanide, magnesium cyanide, calcium cyanide or their mixtures. Among them, preferable are sodium cyanide and potassium cyanide Also usable are cyanohydrins such as acetone cyanohydrin, which donate cyanide ions in water. The cyanogenating agents may be used in an amount of 2 to 10 mols per mol of the compound (I).

The cyanogenation reaction may be carried out preferably at pH 8 to 11, more preferably at pH 8.5 to 10.5. A pH lower than this is not desirable, because hydrogen cyanide readily liberates from the reaction system to lose the cyanogenating agent. While, a pH higher than that is also not desirable, because hydrolysis of higher order of the intermediate and desired products can be promoted in the course of the reaction. The pH value of the reaction mixture may be controlled, for example, by adding a sufficient amount of a buffer. The buffer includes sodium carbonate, sodium phosphate, sodium hydrogencarbonate, dipotassium hydrogenphosphate, sodium dihydrogenphosphate, and potassium dihydrogenphosphate, Alternatively, it may be also possible to control the pH by dropping an acid such as hydrochloric acid, sulfuric acid, phosphoric acid, formic acid, acetic acid, propionic acid, or other strong or weak acid during the reaction.

The cyanogenation reaction may be carried out at a temperature of about 40° to 100° C., preferably about 50° to 90° C. When the reaction is effected at a higher temperature within such range, pH of the system is preferably controlled as low as possible, because the hydrolysis of higher order is easily taken place. When the reaction is carried out at a relatively low temperature, pH is preferably kept as higher as possible within the range described above.

In the method of the present invention, a dehydrogenating agent may be used, particularly advantageously when the starting material (I) having a hydrogen atom as X is used. The dehydrogenating agent includes organic nitro compounds such as nitrobenzene, nitrobenzenesulfonic acid and nitrophenol; sodium, potassium or ammonium salt of organic or inorganic peracids such as peracetic acid, persulfuric acid, perboric acid, or perphosphoric acid; hydrogen peroxide and sulfur. Alternatively, air oxygen may be used. In this case, ammonium molybdate or ammonium vanadate is preferably used at the same time. The dehydrogenating agent may preliminarily be added to the reaction system, or may be added in the course of, or after the reaction.

The reaction may be effected for 2 to 20 hours. After the reaction is over, an excess cyanogenating agent can be removed by the action of sodium hypochlorite or hydrogen peroxide. Thereafter, the reaction mixture may be subjected to filtration for separating the desired compound (III).

The compound of the formula (II) used in this invention can be recovered from filtrate by adding an alkali thereto, and then reused. Distillation may be employed therefor.

This invention is described in further details below by referring to Examples. In the following Examples, parts means parts by weight, and % means % by weight.

EXAMPLE 1

A mixture of 360 parts of polyethylene glycol 400 and 240 parts of water was stirred well at 30° C., and 53.8 parts of 1,4-diaminoanthraquinone-2-sulfonic acid (purity 92.9%) were added thereto. The pH of the solution was adjusted to 7.0 by adding aqueous 10% caustic soda solution. Then, 5.8 parts of nitrobenzene and 40.5 parts of sodium cyanide were added thereto in this order, and the mixture was thoroughly stirred and heated to 65° C. The reaction was allowed to continue for 14 hours until the starting material almost completely disappeared when measured by chromatography. During the course of the reaction, the pH of the system was maintained in the range of 9.4 to 10.0 by adding aqueous 35% sulfuric acid solution.

After excess sodium cyanide was decomposed with 30% hydrogen peroxide solution, the reaction product was subjected to filtration, washing with warm water, and drying, thereby obtaining 45.5 parts of dark blue crystalline powders. Contents and yields of the desired product, by-product, and unreacted starting material were as shown below.

|  | Content | Yield |
| --- | --- | --- |
| 1,4-diamino-2,3-dicyanoanthraquinone | 95.0% | 95.4% |
| 1,4-diamino-2-cyanoanthraquinone | 0.5 | 0.5 |
| Unreacted starting material | 2.2 | 2.0 |

EXAMPLE 2

A mixture of 420 parts of polyethylene glycol 200 and 180 parts of water was stirred well at 30° C., and 53.8 parts of 1,4-diaminoanthraquinone-2-sulfonic acid (purity 92.9%) were added thereto. The pH of the solution was adjusted to 7.0 by adding aqueous 10% caustic soda solution. After 22 parts of sodium mnitrobenzene sulfonate and 53.7 parts of potassium cyanide were added thereto in this order, the mixture was stirred well and heated to 70 ° C. A reaction was allowed to proceed for 16 hours until the starting material almost disappeared when measured by chromatography. During the reaction, the pH of the system was maintained in the range of 9.0 to 9.5 by adding aqueous 30% phosphoric acid solution.

After excess sodium cyanide was decomposed with 30% hydrogen peroxide solution, reaction product was subjected to filtration, washing with warm water and drying, until 45.0 parts of dark blue crystalline powders were obtained. Contents and yields of the desired product, by-product and unreacted starting material were as follows.

|  | Content | Yield |
| --- | --- | --- |
| 1,4-diamino-2,3-dicyanoanthraquinone | 94.0% | 93.4% |
| 1,4-diamino-2-cyanoanthraquinone | 1.3 | 1.4 |
| Unreacted starting material | 1.8 | 1.6 |

EXAMPLE 3

A mixture of 120 parts of polyethylene glycol 300, 15.4 parts of phosphoric acid, and 1080 parts of water was stirred at 30° C., and 156.5 parts of 1,4-diaminoanthraquinone-2,3-disulfonic acid (purity 80.0%) were added thereto. The pH of the solution was adjusted to 7.5 by adding aqueous 28% caustic soda solution. Then 310 parts of aqueous 25% potassium cyanide solution were added thereto, and the mixture was heated to 65° C. with stirring. The reaction was continued until the starting material almost disappeared when measured by chromatography. During the reaction, the pH of the system was maintained in the range of 9.0 to 9.5 by adding aqueous 50% phosphoric acid solution.

Excess potassium cyanide was decomposed by using aqueous sodium hypochlorite solution, and a reaction product was subjected to filtration, washing with warm water and drying until 89.7 parts of dark blue crystalline powders were obtained. Contents and yields of the desired product, by-product, and unreacted starting material were as follows.

|  | Content | Yield |
|---|---|---|
| 1,4-diamino-2,3-dicyanoanthraquinone | 97.0% | 96.0% |
| 1,4-diamino-2-cyanoanthraquinone-3-sulfonic acid | 1.0 | 0.8 |
| Unreacted starting material | less than 0.1 | less than 0.1 |

EXAMPLE 4

To a mixture of 24 parts of polyethylene glycol 600 and 776 parts of water, were added, under stirring, 156.5 parts of 1,4-diaminoanthraquinone-2,3disulfonic acid (purity 80.0%). The pH of the system was adjusted to 7.0 by adding aqueous 28% caustic soda solution. After 242.1 parts of aqueous 25% sodium cyanide solution were added dropwise, the mixture was heated to 70° to 75° C. with stirring. The reaction was continued until the starting material almost disappeared when measured by chromatography. During the reaction, the pH of the system was maintained in the range of 9.4 to 10.0 by adding aqueous 30% phosphoric acid solution.

After excess sodium cyanide was decomposed with hydrogen peroxide solution, a reaction product was subjected to filtration, washing with warm water and drying, until 93.0 parts of dark blue crystalline powders were obtained.

Contents and yields of the desired product, by-product and unreacted starting material were as follows.

|  | Content | Yield |
|---|---|---|
| 1,4-diamino-2,3-dicyanoanthraquinone | 95.5% | 98.1% |
| 1,4-diamino-2-cyanoanthraquinone-3-sulfonic acid | 1.0 | 0.9 |
| Unreacted starting material | less than 0.1 | less than 0.1 |

EXAMPLE 5

To a mixture of 600 parts of polypropylene glycol 400 and 600 parts of water, were added, under stirring, 138.0 parts of 1-amino-4-cyclohexylaminoanthraquinone-2-sulfonic acid (purity 90.5%). Then, 35.0 parts of sodium m-nitrobenzene sulfonate were added thereto. The mixture was stirred at room temperature until all materials were dissolved.

Then, after pH was adjusted to 7.0 by adding aqueous 28% sodium hydroxide solution, 310.0 parts of aqueous 25% potassium cyanide solution were added dropwise. The mixture was heated with stirring to 70 to 75%, and the reaction was continued until the starting material disappeared almost completely when measured by chromatography. During the reaction, the pH of the system was maintained in the range of 9.3 to 9.6 by adding aqueous 30% sulfuric acid solution. After excess potassium cyanide was decomposed with sodium hypochlorite solution, a reaction product was subjected to filtration, washing with warm water and drying, until 117.0 parts of dark blue crystalline powders were obtained.

Yields on the basis of 1-amino-4-cyclohexylaminoanthraquinone-2-sulfonic acid were as follows:

| 1-amino-4-cyclohexylamino-2,3-dicyanoanthraquinone | 92.1% |
|---|---|
| 1-amino-4-cyclohexylamino-2-cyanoanthraquinone | 1.1% |
| Unreacted starting material | 1.1% |

EXAMPLE 6

To a mixture of 360 parts of ethylene glycol and 840 parts of water, were added, under stirring, 120.7 parts of 1-amino-4-ethylaminoanthraquinone-2sulfonic acid (purity 90%). The mixture was stirred until all contents were dissolved at room temperature.

After pH was adjusted to 7.0 by adding 28% sodium hydroxide solution, 276.9 parts of aqueous 25% sodium cyanide solution was added dropwise. The mixture was heated with stirring to 60° to 65° C., and the reaction was continued until the starting material almost disappeared when measured by chromatography. During the reaction, the pH of the system was maintained at 9.5 to 9.8 by adding aqueous 30% sulfuric acid solution.

After excess sodium cyanide was decomposed with sodium hypochlorite solution, a reaction product was subjected to filtration, washing with warm water and drying until 96.5 parts of dark blue crystalline powders were obtained.

Yields on the basis of 1-amino-4-ethylaminoanthraquinone were as follows:

| 1-amino-4-ethylamino-2,3-dicyanoanthraquinone | 93.1% |
|---|---|
| 1-amino-4-ethylamino-2-cyanoanthraquinone | 0.8% |
| Unreacted starting material | 1.1% |

EXAMPLES 7 to 15

In the same manner as in Example 1, 2, 3-dicyanoanthraquinone compounds of the formula (III) were obtained from the corresponding sulfonic acids of the formula (I) as shown in Table 1.

TABLE 1

| Example No. | R | Yield (%) |
|---|---|---|
| 7 | 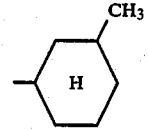 | 92.5 |

TABLE 1-continued

| Example No. | R | Yield (%) |
|---|---|---|
| 8 | 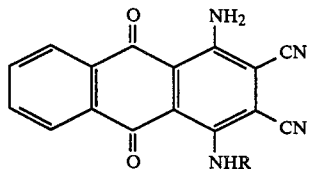 | 94.1 |
| 9 | —(CH$_2$)$_3$—O—C$_2$H$_5$ | 90.0 |
| 10 | —(CH$_2$)$_2$—OC$_4$H$_9$ | 91.5 |
| 11 | —(CH$_2$)$_3$—CH$_3$ | 88.9 |
| 12 | —(CH$_2$)$_5$CH$_3$ | 90.2 |
| 13 | —CH$_3$ | 92.2 |
| 14 | —(CH$_2$)$_3$—OCH$_3$ | 90.5 |
| 15 | CH$_3$ <br>  <br> H | 91.5 |

EXAMPLES 16 to 22

Example 1 was repeated except that various compounds of the formula (II) were used in place of polyethylene glycol 400. Yields of 1,4-diamino-2,3-dicyanoanthraquinone are shown in Table 2.

TABLE 2

| Example No. | HO—(A—O)$_{\overline{n}}$R' | Yield (%) |
|---|---|---|
| 16 | HO—(CH$_2$CH$_2$O)$_{\overline{3}}$H | 92.0 |
| 17 | polyethylene glycol 600 | 92.9 |
| 18 | polyethylene glycol 1000 | 92.3 |
| 19 | HO—(CH$_2$CH$_2$O)$_{\overline{2}}$C$_2$H$_5$ | 89.0 |
| 20 | HO—(CH$_2$CH$_2$O)$_{\overline{2}}$H | 91.9 |
| 21 | polypropylene glycol 1000 | 90.5 |
| 22 | HO—(CH$_2$CH$_2$O)$_{\overline{3}}$CH$_3$ | 90.7 |

We claim:

1. A method for producing an anthraquinone compound having the formula (III)

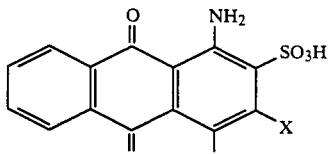

where R is a hydrogen atom, or an unsubstituted or substituted alkyl or cycloalkyl group, which comprises reacting a compound having the formula (I), or a salt thereof $$\text{(I)}$$

wherein R is defined as above and X is an hydrogen atom or a sulfonic acid group, in an aqueous medium with a cyanogenating agent in the presence of a compound of the formula (II), $$\text{HO—(A-O)}_{\overline{n}}\text{R'} \quad \text{(II)}$$

wherein A is a bivalent aliphatic saturated hydrocarrbon residual group having 2 to 4 carbon atoms, R' is a hydrogen atom or an alkyl group having 1 to 4 carbon atoms, and n is a number of from 1 to 100, the compound of formula (II) being present in an amount of from 2 to 90% by weight based on the total weight of the compound of the formula (II) and the aqueous medium, containing no quaternary ammonium or quaternary phosphonium compound.

2. A method according to claim 1, wherein the compound of the formula (II) in which A is an ethylene, propylene, trimethylene, or tetramethylene group is used.

3. A method according to claim 1, wherein the compound of the formula (II) in which R' is a hydrogen atom, or a methyl, ethyl, n-propyl, n-butyl, isopropyl, isobutyl, sec-butyl or tert.-butyl group is used.

4. A method according to claim 1, wherein as the compound of the formula (II), polyethylene glycol having an average molecular weight of 200 to 600 is used.

5. A method according to claim 5, wherein the total weight of the compound of the formula (II) and the aqueous medium ranges from 2 to 30 times by weight the weight of the compound of the formula (I).

6. A method according to claim 1, wherein the cyanogenating agent is a cyanide or a cyanohydrin.

7. A method according to claim 1, wherein the cyanogenating agent is used in an amount of 2 to 10 mols per mol of the compound of the formula (I).

8. A method according to claim 1, wherein the reacting is effected at a pH of 8 to 11.

9. A method according to claim 1, wherein the reacting is effected at a temperature of 40° to 90° C.

* * * * *